(12) United States Patent
Piirainen

(10) Patent No.: US 6,748,031 B1
(45) Date of Patent: Jun. 8, 2004

(54) METHOD OF PARAMETER ESTIMATION AND RECEIVER

(75) Inventor: Olli Piirainen, Oulu (FI)

(73) Assignee: Nokia Corporation, Espoo (FI)

(\*) Notice: Subject to any disclaimer, the term of this patent is extended or adjusted under 35 U.S.C. 154(b) by 0 days.

(21) Appl. No.: 09/503,016

(22) Filed: Feb. 11, 2000

Related U.S. Application Data

(63) Continuation of application No. PCT/FI98/00672, filed on Aug. 28, 1998.

(30) Foreign Application Priority Data

Aug. 29, 1997 (FI) .................................................. 973564

(51) Int. Cl.$^7$ .............................................. H03D 1/00
(52) U.S. Cl. ...................... 375/340; 375/341; 375/316; 375/262; 375/147; 375/136
(58) Field of Search .................. 375/229, 262, 375/341, 350, 231, 340, 330, 230, 136, 316, 219, 130, 147, 344, 329; 714/796, 708

(56) References Cited

U.S. PATENT DOCUMENTS

| 5,263,033 A | | 11/1993 | Seshadri |
| 5,303,263 A | | 4/1994 | Shoji et al. |
| 5,412,686 A | * | 5/1995 | Ling ........................... 375/147 |
| 5,432,794 A | | 7/1995 | Yaguchi |
| 5,471,501 A | * | 11/1995 | Parr et al. .................. 375/354 |
| 5,581,580 A | * | 12/1996 | Lindbom et al. ........... 375/340 |
| 5,621,769 A | | 4/1997 | Wan et al. |
| 5,673,294 A | * | 9/1997 | Namekata .................... 375/341 |
| 6,125,152 A | * | 9/2000 | Golden et al. ............... 375/340 |
| 6,269,124 B1 | * | 7/2001 | Nagayasu et al. .......... 375/262 |

FOREIGN PATENT DOCUMENTS

| JP | 0625971 | 9/1994 |
| WO | WO 91/10296 | 7/1991 |
| WO | WO 94/00924 | 1/1994 |
| WO | WO 94/28661 | 12/1994 |

OTHER PUBLICATIONS

A copy of International Search Report for PCT/FI98/00672.

\* cited by examiner

*Primary Examiner*—Stephen Chin
*Assistant Examiner*—Ted Wang
(74) *Attorney, Agent, or Firm*—Squire, Sanders & Dempsey L.L.P.

(57) ABSTRACT

The invention relates to a method for parameter estimation in a digital radio system receiver, and a receiver. The receiver comprises a detector generating a number describing the probability of a received symbol using soft decision metrics. Mean values of the numbers describing the received symbol probability by which an estimator generates a new channel estimate are generated. As the energy of different symbols varies the channel estimate to be generated is weighted by the symbol energy to be generated. The channel estimate change can be attenuated by averaging or by multiplying the change by a weighting value. The channel estimate of the invention can also be used in the estimation of other data communication parameters whereby, for example, the Doppler error can be corrected.

16 Claims, 1 Drawing Sheet

METHOD OF PARAMETER ESTIMATION AND RECEIVER

This application is a continuation of international application serial number PCT/FI98/00672, filed Aug. 28, 1998.

FIELD OF THE INVENTION

The invention relates to a method for parameter estimation in a digital radio system receiver comprising a detector generating a number describing the probability of a symbol received using soft decision metrics.

The invention further relates to a digital radio system receiver for desired parameter estimation comprising a detector for generating a number describing the probability of a symbol received using soft decision metrics.

BACKGROUND OF THE INVENTION

In radio systems a channel estimate is a set of parameters, or a vector, which can be generated using various algorithms. The channel estimate is needed, for example, in different radio system detectors for detecting a received signal. The channel estimate is usually generated using a training sequence or the like, whereby, for example in the GSM system, the training sequence is correlated with received samples. Prior art algorithms often utilize Least Square Problem. A common Least Square Error Problem can be solved by using a Kalman filter, an extended Kalman filter, a Recursive Least Square and a Least Mean Square. Typically these algorithms are designed for parameter estimation, where predetermined data is available, but there are also algorithms intended for Blind Equalization, such as the Expectation Maximization algorithm. The channel estimate is not a constant at different times but changes continuously. Thus the channel estimate generated using a training sequence is not necessarily suitable for data detection.

U.S. patent publication 5,263,033 represents prior art and is incorporated herein by reference. In the solution of the publication preliminary symbol decisions are fed back to the LMS algorithm in order to specify the channel estimate during the calculation of the Viterbi algorithm trellis. A problem with this solution is that in order to specify the channel estimate preliminary or actual decisions are needed that may either be correct or incorrect ones. Consequently, when the decision is incorrect the channel estimate is incorrectly corrected which leads to a poorer final result than was expected in the received signal processing.

BRIEF DESCRIPTION OF THE INVENTION

It is an object of the invention to provide a parameter estimation method and a receiver implementing the method so as to solve the above problems and to be able to correct a parameter estimate without preliminary or final decisions.

This is achieved with the type of method described in the preamble characterized by generating a mean value of the numbers describing the probability of a received symbol and generating a new channel estimate as a parameter utilizing the mean value.

The receiver of the invention is, in turn, characterized by comprising means to estimate a channel estimate utilizing a mean value generated from the numbers describing the probability of a received symbol produced by a detector, and the detector being arranged to estimate a desired parameter using the generated channel estimate.

The method and system of the invention provide several advantages. The solution avoids using symbol decisions and at the same time avoids correcting a parameter estimate together with incorrect decisions. The solution also improves the sensitivity of the receiver since the estimated channel estimate will be better. The solution can also be used as an in-built Doppler equalizer of the receiver.

BRIEF DESCRIPTION OF THE DRAWINGS

In the following the invention will be described in greater detail in connection with preferred embodiments with reference to accompanying drawings, in which.

DETAILED DESCRIPTION OF THE INVENTION

The invention is applicable to digital radio systems such as the GSM and DCS-1800 without restricting it thereto. The inventive solution deals with an adaptive algorithm of blind parameter estimation. In blind estimation correction is performed without utilizing preknown data.

Let us first take a closer look at the theoretical background of the invention. A channel estimate parameter h can be estimated from samples y received using Minimum Mean Square Error and from estimated unreliable data $\tilde{X}$ as follows:

$$h = \arg \min(E((y-\tilde{X}h)^2|y)),$$

where E represents a mean value operator, the received samples y are assumed to be known and the block type represents a matrix or vector form presentation. It is thus intended to minimize the effective difference between a received signal y and a reference signal $\tilde{X}h$ in the method. The lowest square difference is obtained by derivating the above equation according to an estimated channel response term $h_n$ as follows:

$$\frac{\partial h}{\partial h_n} = \frac{\partial \left\{ E\left[ \left( y_k - \sum_i h_i \tilde{x}_{k-i} \right)^2 \middle| y \right] \right\}}{\partial h_n} = 0,$$

where $\tilde{x}_{k-i}$ represents an estimated symbol i corresponding to a sample k of the received signal y. Performing derivation the following condition is obtained for the estimated channel estimate:

$$h_n = \frac{\left[ y_k - \sum_{i \neq n} h_i E(\tilde{x}_{k-i} | y) \right] E(\tilde{x}'_{k-n} | y)}{E(\tilde{x}'_{k-n} \tilde{x}_{k-n} | y)},$$

where $h_i$ is one channel estimate term, E represents the mean value of probabilities, $\tilde{x}_{k-i}$ represents the estimated symbol i corresponding to the sample k of the received signal y, E($\tilde{x}_{k-i}|y$) represents the mean value of symbol $\tilde{x}_{k-i}$ on condition that signal y is received, y representing the received signal, $y_k$ is the $k^{th}$ sample of the received signal and $\tilde{x}'_{k-i}$ is the complex conjugate, transpose or the like of $\tilde{x}_{k-i}$. This result is weighted by the mean values $$\frac{E(\tilde{x}'_{k-n} \mid y)}{E(\tilde{x}'_{k-n}\tilde{x}_{k-n} \mid y)}$$

of the symbol probabilities. The inventive solution thus differs from prior art solutions, even though it resembles, for example, the LMS algorithm and represents an efficient way of determining a channel estimate, and by using it, also another important parameter for the radio connection. The inventive solution can be made more efficient by employing averaging or a weighting coefficient of the channel estimate change when searching for a new channel estimate.

Figure 1:
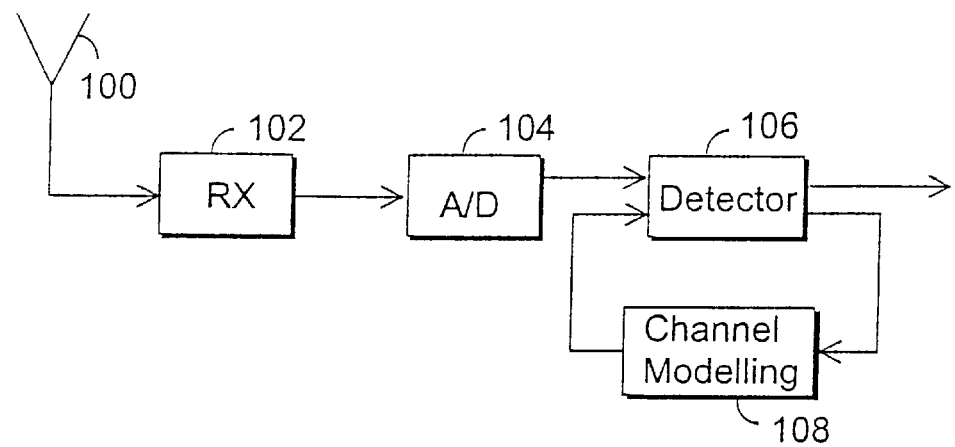
FIG. 1 shows a radio system receiver.

Let us now take a closer look at the receiver of the invention. FIG. 1 shows a block diagram of a typical radio system receiver. The receiver comprises an antenna 100, a radio frequency part 102, an AND converter, a detector 106 and a channel estimator 108. A signal received from the antenna 100 propagates to the radio frequency part 102 where the radio frequency signal is multiplied and filtered to a lower frequency in a known manner. Then the still analogue signal is converted into a digital signal in the A/D converter 104 and the digital signal propagates further to the detector 106 where the transmitted symbols are demodulated and detected. The digital radio system symbols are generated from bits or bit combinations. The channel estimator 108 generates an estimate of a channel impulse response utilized in detection in a known manner. The detector 106 produces a soft symbol decision, which in addition to the detected symbol informs of the reliability of the decision. From the decision reliability a number describing the symbol probability can be generated in a known manner, the detection of the inventive solution also producing the number.

Figure 2:
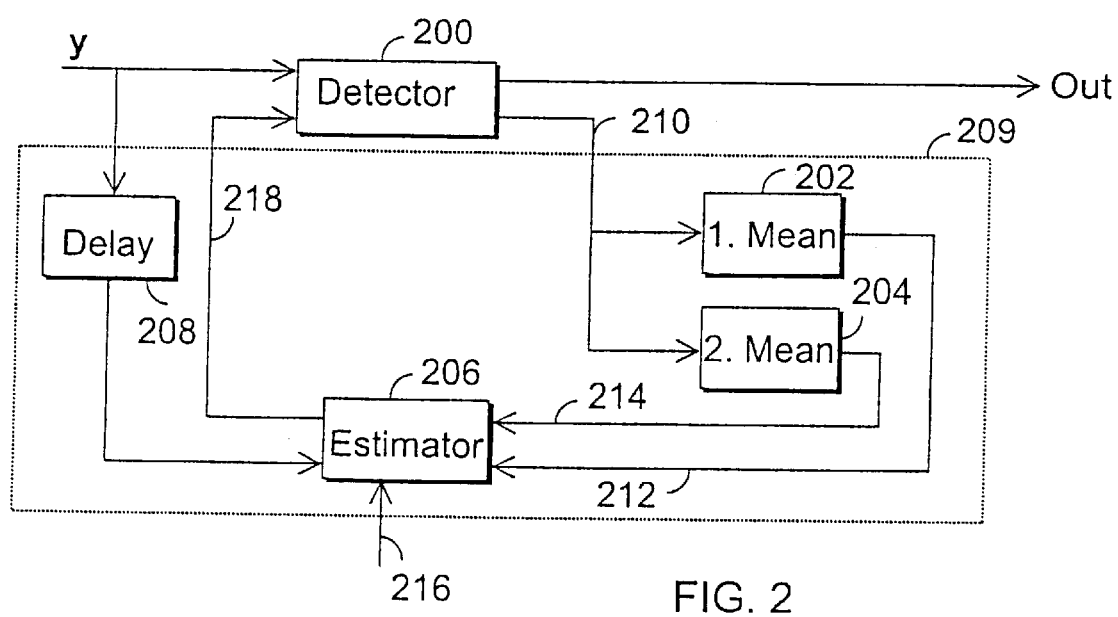
FIG. 2 shows a fed back parameter equalizer block.

FIG. 2 shows the entirety of a parameter equalizer comprising a detector 200, first means 202 to generate a mean value, second means 204 to generate a mean value, an estimator 206 and delay means 208. Means 209 including the means 202–208 generate a feedback part of the equalizer. When the received signal y arrives at the detector 200 the parameter equalizer tends to correct the distortions caused by the channel to the signal. The parameter equalizer is preferably a channel equalizer correcting the channel estimate. The received signal y can be presented as a convolution of the channel impulse response and the transmitted signal. In the general mode the convolution is calculated between two functions f(t) and g(t) as follows:

$$f(t) * g(t) = (f * g)(t) = \int_0^t f(\tau)g(t-\tau)d\tau,$$

where t and τ are variables and * represents the convolution. The receiver estimates the actual impulse response with the channel estimate usually comprising 5 taps. The channel estimate can be generated in the receiver, for example, using the predetermined sequences in the signal. A distorted signal is returned to its original form in the channel equalizer utilizing an inverted channel estimate. Since the channel estimate thus generated does not correspond adequately to the actual channel impulse response and therefore the channel correction is not adequate either, the channel estimate is specified in the inventive solution utilizing the mean value of the numbers describing the received symbol probability.

Let us now examine in more detail the function of the parameter equalizer according to FIG. 2. A channel estimate is the parameter and a channel equalizer is thus the parameter equalizer of the detector 200. The detector 200, which can be a Viterbi detector or the like, generates using soft decision metrics a number $p(\tilde{x} \mid y)$ 210 describing the probability of the estimated symbol $\tilde{x}$ received in accordance with prior art on condition that signal y is received and not, for example, only noise. Generally r different real or complex symbols are used in transmission, the symbol $\tilde{x}$ then being one of the symbols $\tilde{x}_1, \ldots, \tilde{x}_r$. The numbers describing the probability of each symbol alternative are added together and a mean value 212 is generated in the means 202, for example, according to the following formula:

$$E(\tilde{x} \mid y) = \Sigma[p(\tilde{x}_i \mid y)\tilde{x}_i],$$

where E represents the mean value operator of probabilities. In the second means 204 for generating the mean value the energy 214 of the estimated symbol $\tilde{x}$ is generated so that the symbol $\tilde{x}$ is multiplied by its complex conjugate $\tilde{x}'$ or the like and the mean value thereof, being $E(\tilde{x}'\tilde{x} \mid y)$, is generated. However, the means 204 are not needed if coding is performed in such a manner that the energy or amplitude of all symbols is constant, since then the mean value $E(\tilde{x}'\tilde{x} \mid y)$ too, always becomes a constant and does not have to be separately calculated. Such is the situation for example in the GSM system where binary modulation is used and the symbol x to be transmitted obtains the values 1 or −1. Thus, the mean value $E(\tilde{x}'\tilde{x} \mid y)$ 214 obtains the value 1. In order to generate a channel estimate the means 208 delay the received signal y to such an extent that the timing of the signal y corresponds with the estimated symbol $\tilde{x}$. Using the mean values 212 and 214, the delayed signal y and the previous channel estimate 216, which can be, for example, obtained as an initial value from the training sequence or be a result of a previous estimation, the estimator 206 generates a new channel estimate $h=[h_1, \ldots, h_p]^T$, where p is the number of channel estimate taps, e.g. as follows:

$$h_n = \frac{\left[y_k - \sum_{i \neq n} h_i E(\tilde{x}_{k-i} \mid y)\right] E(\tilde{x}'_{k-n} \mid y)}{E(\tilde{x}'_{k-n}\tilde{x}_{k-n} \mid y)},$$

where $h_i$, is the previous channel estimate or the mean value of the channel estimate, $\tilde{x}_{k-i}$ represents the estimated symbol i corresponding to the sample k of the received signal y, $E(\tilde{x}_{k-i} \mid y)$ represents the mean value of the numbers describing the probability of the symbol $\tilde{x}_{k-i}$ on condition that signal y is received, y representing the received signal, $y_k$ is the $k^{th}$ sample of the received signal and $\tilde{x}'_{k-i}$ is the complex conjugate, transpose or the like of $\tilde{x}_{k-i}$. However, a channel estimate h generated in such a way changes (too) rapidly according to the channel impulse response, and it is not due to the delay the correct one for the received signal. It is possible to delay a too rapid change by using, for example, the following iteration formula in the estimator 206:

$$h_{n\_new} = h_{n\_prev} + \mu(h_n - h_{n\_prev}),$$

where $h_{n\_new}$ is the new channel estimate, $h_{n\_pre}$ is the previous channel estimate, $h_n$ is the current channel estimate and $\mu$ is the weighting coefficient between [0, 1] selected by the user. Another alternative is to use averaging of more than one channel estimate h. A new channel estimate h 218 thus generated is fed into the detector 200 to be used in the channel equalizer.

This inventive method can be used for example in Minimum Shift Keying coding. In the I/Q diagram (I=Inphase and Q=Quadrature) the MSK coding symbols are symmetrically at 45°, 135°, 225° and 315° angles on the periphery of a unit circle. In a distorted channel these angles tend to change and this erroneous change can be corrected utilizing the channel estimate obtained by the inventive solution.

Typically the channel estimate is generated by means of a training sequence. Since the training sequence is not useful signal i.e. actual data is not transferred, it is usually kept as short as possible. For this reason the generated channel estimate is incomplete and noisy and therefore the detector cannot detect the transmitted signal perfectly. The solution of the invention can improve the quality of the channel estimate, even if the channel estimate does not change at all during a burst and thus improve detection.

Since the training sequence is at a certain point of the burst, the actual impulse response of the channel can be very different at the data sequence owing to terminal movement than a channel estimate generated at the training sequence. The inventive method is preferably able to correct the channel estimate also in this situation.

The inventive solution can be efficiently used also to correct the Doppler transition. The Doppler error is caused by terminal movement. When the terminal has a line of sight to the base station, the channel estimate change corresponds to a phase error of the signal. Since the inventive solution determines the channel estimate change, the phase error can preferably also be detected and corrected.

As for the digital signal processing in particular the solutions of the invention can be implemented using, for example, ASIC or VLSI circuits and the digital functions to be performed are preferably carried out as software based on microprocessor technique.

Even though the invention has been described above with reference to the example of the accompanying drawings, it is obvious that the invention is not restricted thereto but can be modified in various ways within the scope of the inventive idea disclosed in the attached claims.

What is claimed is:

1. A method for parameter estimation in a digital radio system receiver, the receiver comprising a detector generating a number describing a probability of a received symbol using soft decision metrics, the method comprising the steps of:
   generating a mean value of numbers describing the probability of the received symbol; and
   generating a new channel estimate as a parameter utilizing the mean value.

2. The method of claim 1, further comprising the step of:
   generating a new term of the channel estimate mainly by comparing a received signal to a sum of products of channel estimates and mean values, when the channel estimate comprises several terms.

3. The method of claim 1, further comprising the step of:
   generating terms $h_n$ of the channel estimate by comparing a received signal to a sum of products of channel estimates and mean values wherein a channel estimate comprises:

$$h_n = \frac{\left[y_k - \sum_{i \neq n} h_i E(\tilde{x}_{k-i} | y)\right] E(\tilde{x}'_{k-n} | y)}{E(\tilde{x}'_{k-n}\tilde{x}_{k-n} | y)},$$

wherein $h_i$ is the channel estimate, E represents a mean value operator of probabilities, $\tilde{x}_{k-i}$ represents an estimated symbol i corresponding to a sample k of the received signal, $E(\tilde{x}_{k-i}|y)$ represents the mean value of the probability on condition that signal y is received, y representing the received signal, $E(\tilde{x}'_{k-n}|y)$ represents an energy of symbol $\tilde{x}_{k-n}$, $y_k$ is a $k^{th}$ sample of the received signal and $\tilde{x}'_{k-i}$ is a complex conjugate of $\tilde{x}_{k-i}$.

4. The method of claim 1, further comprising the step of:
   attenuating changes of the channel estimate in relation to a previous channel estimate.

5. The method of claim 4, wherein the attenuating step further comprises:
   attenuating a change of the channel estimate in relation to the previous channel estimate using a weighting coefficient and generating a new channel estimate as follows:

$$h_{n\_new} = h_{n\_prev} + \mu(h_n - h_{n\_prev}),$$

wherein $h_{n\_new}$ is the new channel estimate, $h_{n\_prev}$ is the previous channel estimate, $h_n$ is the a current channel estimate and $\mu$ is the weighting coefficient, wherein the weighting coefficient has a value of between 0 and 1, and wherein the weighting coefficient value is selected by the user.

6. The method of claim 4, wherein the attenuating step further comprises:
   attenuating a change of the channel estimate in relation to the previous channel estimate by calculating an average of several channel estimates.

7. The method of claim 1, further comprising the step of:
   generating a desired parameter comprising a phase, wherein the generating step includes using a channel estimate, whereby a Doppler error can be corrected.

8. A digital radio system receiver for desired parameter estimation, the receiver comprising:
   a detector configured to generate a number describing a probability of a received signal using soft decision metrics; and
   estimation means, operably connected to the detector, for estimating a channel estimate utilizing a mean value generated from numbers describing the probability of the received symbol produced by the detector and the detector being arranged to estimate a desired parameter using the channel estimate.

9. The receiver of claim 8, further comprising:
   first generating means, operably connected to the detector, for generating the mean value from the numbers describing the received symbol probability; and
   an estimator, operably connected to the detection means and configured to compare the received signal to a sum of products of channel estimates and mean values and to generate new terms of the channel estimate, when the channel estimate comprises several terms.

10. The receiver of claim 9, further comprising:
    delay means, operably connected to the detector, for delaying samples y of the received signal, wherein the estimator generates terms $h_n$ of the channel estimate by comparing the received signal to the sum of the products of the channel estimates and the mean values when an energy of transmitted symbols is constant as follows:

$$h_n = \left[y_k - \sum_{i \neq n} h_i E(\tilde{x}_{k-i} | y)\right] E(\tilde{x}'_{k-n} | y),$$

wherein $h_i$ is a channel estimate term, E represents a mean value operator of probabilities, $\tilde{x}_{k-i}$ represents an estimated symbol i corresponding to a sample k of the received signal, $E(\tilde{x}_{k-i}|y)$ represents the mean value of the symbol probability on condition that signal y is received, y representing the received signal, $y_k$ is a $k^{th}$ sample of the received signal and $\tilde{x}'_{k-i}$ is a complex conjugate of $\tilde{x}_{k-i}$.

11. The receiver of claim 9, further comprising:
second generating means, operably connected to the detector, for generating the symbol energy, wherein the first generating means generate the mean values of the numbers describing the received symbol probability;
delay means, operably connected to the detector, for delaying samples y of the received signal, wherein the estimator generates terms $h_n$ of the channel estimate by comparing the received signal to the sum of the products of the channel estimates and the mean values as follows:

$$h_n = \frac{\left[y_k - \sum_{i \neq n} h_i E(\tilde{x}_{k-i}|y)\right] E(\tilde{x}'_{k-n}|y)}{E(\tilde{x}'_{k-n}\tilde{x}_{k-n}|y)},$$

wherein $h_i$ is a channel estimate, E represents a mean value operator of probabilities, $\tilde{x}_{k-i}$ represents the estimated symbol i corresponding to the sample k of the received signal, $E(\tilde{x}_{k-i}|y)$ represents the mean value of the symbol probability on condition that signal y is received, y representing the received signal, $E(\tilde{x}_{k-n}\tilde{x}'_{k-n}|y)$ represents the energy of symbol $\tilde{x}_{k-n}$, $y_k$ is a $k^{th}$ sample of the received signal and $\tilde{x}'_{k-i}$ is a complex conjugate of $\tilde{x}_{k-i}$.

12. The receiver of claim 8, wherein the estimator is arranged to attenuate changes of the channel estimate compared with a previous channel estimate.

13. The receiver of claim 12, wherein the estimator is arranged to attenuate a change of the channel estimate in relation to the previous channel estimate by generating a term $h_{n\_new}$ of the channel estimate as follows:

$$h_{n\_new} = h_{n\_prev} + \mu(h_n - h_{n\_prev}),$$

wherein $h_{n\_new}$ is a new channel estimate term, $h_{n\_prev}$ is the previous channel estimate term, $h_n$ is a current channel estimate term and $\mu$ is a weighting coefficient, wherein the weighting coefficient has a value of between 0 and 1, and wherein the weighting coefficient value is selected by the user.

14. The receiver of claim 11, wherein the estimator is arranged to attenuate a change of the channel estimate in relation to a previous channel estimate by generating an average of several channel estimates.

15. The receiver of claim 8, wherein the estimation means estimates the desired parameter and wherein the desired parameter includes a phase generated by means of the channel estimate and the detector is arranged to correct a Doppler error.

16. A digital radio system receiver for desired parameter estimation, the receiver comprising:
a detector configured to generate a number describing a probability of a received signal using soft decision metrics; and
an estimation unit, operably connected to the detector and configured to estimate a channel estimate utilizing a mean value generated from numbers describing the probability of the received symbol produced by the detector, wherein the detector is arranged to estimate a desired parameter using the channel estimate.

* * * * *